May 15, 1962 C. E. MITCHELL 3,035,211

SUBSCRIBER CALLING APPARATUS

Filed Oct. 21, 1958 3 Sheets-Sheet 1

INVENTOR
C. E. MITCHELL

BY John E. Wagner
ATTORNEY

May 15, 1962 C. E. MITCHELL 3,035,211

SUBSCRIBER CALLING APPARATUS

Filed Oct. 21, 1958 3 Sheets-Sheet 2

INVENTOR
C. E. MITCHELL
BY John E. Wagner
ATTORNEY

May 15, 1962 C. E. MITCHELL 3,035,211

SUBSCRIBER CALLING APPARATUS

Filed Oct. 21, 1958 3 Sheets-Sheet 3

INVENTOR
C. E. MITCHELL
BY John E. Wagner
ATTORNEY

United States Patent Office 3,035,211

Patented May 15, 1962

3,035,211

SUBSCRIBER CALLING APPARATUS

Clifford E. Mitchell, Warren Township, Somerset County, N.J., assignor to Bell Telephone Laboratories, Incorporated, New York, N.Y., a corporation of New York Filed Oct. 21, 1958, Ser. No. 768,737

16 Claims. (Cl. 317—101)

This invention relates to telephone calling circuit assemblies and switching apparatus therefor.

With the advent of the electronic telephone switching systems, in contrast to conventional electromechanical systems and the use of multifrequency signaling in place of dial pulses, a real need exists for a simple, reliable circuit and pushbutton assembly for use in telephone subscriber installations.

An example of the type of a proposed substation calling circuit is shown in the copending patent application of L. A. Meacham and F. West, Serial No. 759,474 filed September 8, 1958. That circuit employs an oscillator at the substation powered over the telephone line, a pair of tuned circuits for establishing two frequencies of oscillation of the oscillator and means for connecting the oscillator to the telephone line and performing other switching functions as well. To utilize such a circuit, it is advantageous that an array of pushbuttons be mounted so as to operate contacts and determine any of sixteen combinations of eight frequencies and to perform the necessary switching functions. The circuit requires numerous connections to the pushbuttons but also requires mechanical independence for ease of manufacture and maintenance. A general requirement or object of this invention therefore is to insure reliable operation of multiple switch mechanisms.

Another object of this invention is to achieve in a multiple switch, the characteristic of a mechanical resistance to operation of each pushbutton which includes a controllable sharp reduction or breakthrough after a portion of travel.

Still another object of this invention is to facilitate the incorporation of the entire calling circuit and switching assembly into a unit directly interchangeable with a conventional telephone dial.

All of these requirements and objects of the circuit assembly and switching mechanism are accomplished in accordance with this invention, one embodiment of which comprises a multilayer assembly having a circular outline being in the order of four or five inches in diameter and one to one and one-half inches deep, exclusive of the pushbuttons, thereby constituting a unit physically interchangeable with the conventional dial. The cover of the assembly includes a plurality of openings through which the operating surface of a like number of pushbuttons extend. Beneath the cover is a frame, including a channel for positioning a slide plate. The slide plate includes pushbutton openings each having a beveled surface which cooperates with a similar beveled surface of the pushbuttons to displace the slide plate laterally along the channel of the frame by the operation of any of the pushbuttons. Mounted to the side of the slide plate and secured to the frame is a snap-action switch including an arm extending into the recess of the slide plate to be actuated upon displacement of the slide plate. The arm of the switch terminates in a yoke which is pivotally secured to the frame of the assembly. The yoke encompasses an armature similarly pivotally mounted and a spring compressed between the arm portion and free end of the armature. The spring is under controllable compression determined by an internal screw in the arm.

Underlying the slide plate is a printed circuit board including a plurality of pairs of longitudinally-extending conductors with one side thereof and a plurality of pairs of transversely-extending conductors on the opposite side thereof. Electrical connections extend through the board in the form of studs mounting flat-spring elements which extend over adjacent conductors and include the contact surface adjacent the remote conductor of each pair. A pair of such spring elements is positioned directly beneath each pushbutton so that upon the operation of any of the pushbuttons the two electrically independent crosspoint circuits are closed.

The periphery of the printed circuit plate includes terminations of the pairs of conductors at threaded collars secured to the board. A circuit board including appropriate interconnections of a comparable size to the crosspoint board is secured, for example, by screws which mate with the threaded collars of the printed circuit board. The screws contact terminations of the circuit conductors on that board, thereby making the necessary interconnection between the two boards, while allowing the two boards to be electrically and mechanically disassembled readily. The circuit board constitutes the back surface of the assembly.

One feature of this invention involves the incorporation in a multiple pushbutton array of a switch having controllable nonlinear mechanical resistance to operation coupled to all pushbuttons.

Another feature of this invention relates to the utilization of a double crosspoint array on a single printed circuit board and including pairs of contact elements arranged to effect the simultaneous closure of a pair of independent crosspoint circuits by operation of any of the pushbuttons.

Still another feature of this invention relates to the assembly in pileup fashion of a circuit and the switching mechanisms therefor which constitute a plurality of laminae with demountable mechanical securing elements constituting the electrical connections between the laminae.

These and other features of this invention may be seen from the following description and by reference to the drawing wherein.

Figure 1:
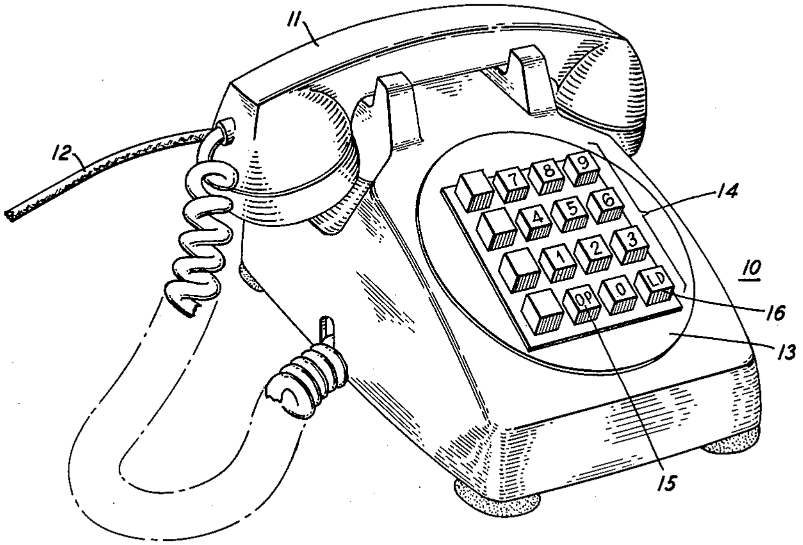
FIG. 1 is a perspective representation of a telephone set employing the pushbutton calling assembly of this invention.

Referring now to FIGS. 1–4, a telephone set 10 including a handset 11, line cord 12 and calling mechanism 13 as seen in FIG. 1 are shown. The calling mechanism employs an array of sixteen pushbuttons 14 numbered 1 through 0 for the normal dial digits and operator key 15 used for signaling the operator as for assistance and an LD key 16 for initiating a long-distance call. Four additional buttons 14 shown unmarked may be utilized for future telephone services or may be omitted. The pushbuttons 14 all have the same distance of travel and are designed, as will hereinafter be seen, to perform the necessary switching functions during the period of downward travel and include a length of over-travel including a break-through characteristic after the switching has been performed and prior to encountering solid resistance.

The calling mechanism 13, which is mountable as a unit in the telephone set 10 in the same volume as occupied by a conventional dial is intended and arranged for direct substitution for a conventional dial. The assembly may be seen in FIG. 2, wherein the pushbuttons 14 extend out of a cover plate 20 against which shoulders 21 of the pushbuttons 14 rest in the normal unoperated position, maintained in that position by a return spring 22. The cover plate 20 is secured to a frame 23, including a recess 24. Ball bearings 25 mount a slide plate 30 for facile transverse movement. The slide plate 30 includes openings 31 through which a plunger portion 32 of the pushbuttons 14 extends. The slide plate 30 and pushbuttons 14 include mating cam surfaces 52, 53 best seen in FIGS. 5 and 7 which serve to displace the slide plate 30 upon depression of any of the pushbuttons 14. The plunger 32 of the pushbuttons 14 extends through the frame 23 and includes a spring-loaded operating head 33 (FIG. 2) which extends into contact with spring contact elements 34 mounted on studs 35 secured through a crosspoint switchboard 40. Several additional studs 41 around the periphery of the crosspoint switchboard secure a printed circuit board 42 thereto. The circuit board 42 mounts the several components making up the calling circuit, including a pair of inductors 43 and associated capacitors 44 and a resistor 45.

Figure 4:
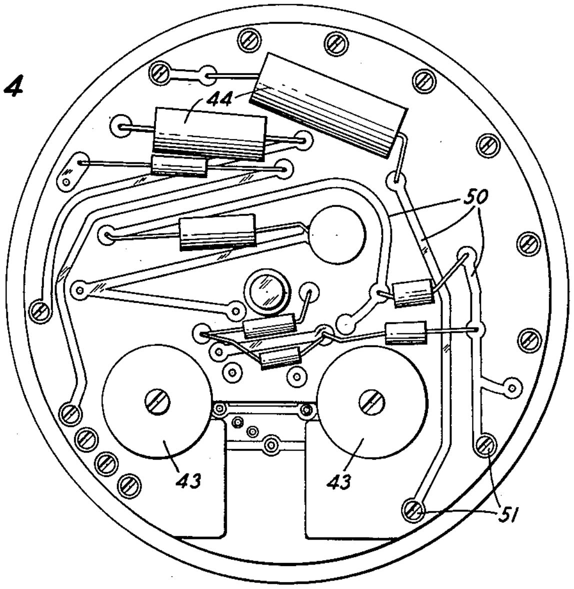
FIG. 4 is a plan view of the rear of the assembly showing the circuit elements and interconnections therefor.

Referring now to FIG. 4, the circuit board 42 may be seen mounting the inductors 43, capacitors 44 and other elements of the circuit and interconnected by conducting paths 50 on the surface of the board. Several of the paths terminate in holes in the periphery through which mounting screws 51 extend and make electrical connection to the next lamina which is the crosspoint switchboard 40.

Figure 5:
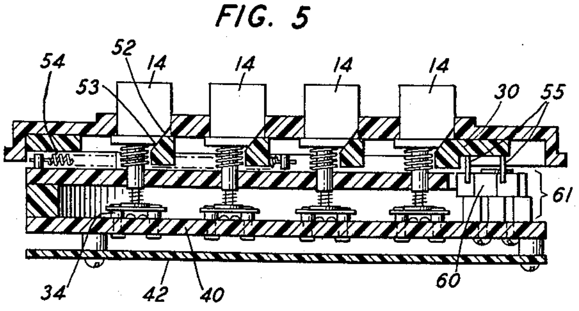
FIG. 5 is a vertical section of the assembly of FIG. 3 along the line 5—5.
Figure 6:
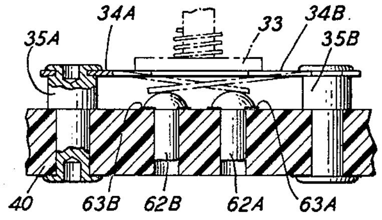
FIG. 6 is an enlarged sectional showing of a portion of the contact arrangements along the line 6—6 of FIG. 3.
Figure 7:
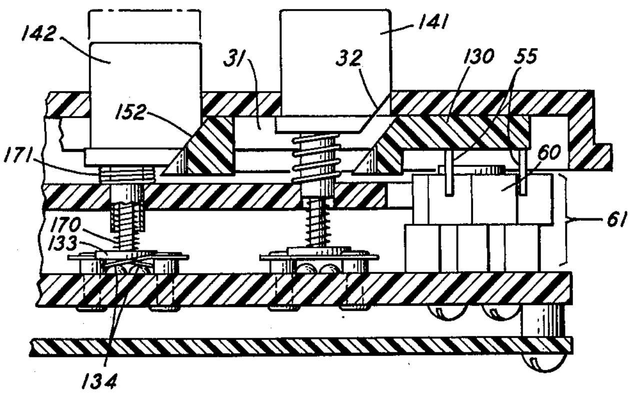
FIG. 7 is an enlarged elevational section of a portion of the switching mechanism with one pushbutton shown in the operated and the other in the unoperated position.

The details of the switching mechanism may best be seen in FIGS. 5, 6 and 7. In FIG. 5, a row of four pushbuttons 14, all in unoperated condition, appear, including a beveled cam surface 52 in the lower right-hand corner, as shown in the figure. The beveled surface 52 rests on a mating inclined cam surface 53 of the slide plate 30 which is maintained in position by a pair of return springs 54, one of which appears in FIG. 5 of the drawing. The slide plate 30 which is actuatable in a direction from left to right in FIG. 5 includes a pair of fingers 55 which bracket the arm of a transfer switch 61 which may be seen in FIGS. 3 and 8. The fingers 55 upon movement of the slide plate 30 rotate the arm 60 of the transfer switch 61 to effect a transfer from a normal condition with the two contacts closed to an operated condition with the two contacts open and a single contact closed. Upon release of the operated pushbutton 14, the return springs 54 insure that the slide plate 30 returns the transfer switch 61 to its unoperated position. The operation and return of the transfer switch occur after the closing of the pair of spring contacts 34 associated with the pushbutton 14.

In FIG. 6, the extent of movement of the spring elements 34 appears as a dot-dash line as they are depressed by the operating head 33 of the pushbutton. It should be noted that each spring element of semicircular shape as may be seen in FIGS. 3 and 8, makes contact with the remote one of the pair of conductors passing under the pushbutton. For example, as shown in FIG. 6, spring contact element 34A mounted on stud 35A extends over and around a button contact 62B passing through a circuit conductor 63B and into electrical contact with button 62A which engages circuit conductor 63A. Similarly, spring contact 34B on stud 35B extends over conductor 63A and contacts button 62B. In this case, fixed contacts or buttons 62A and B secured to the printed wiring board 40 are used. However, it has been found that they may be eliminated and the spring elements 34A and B be allowed to make direct contact with the printed conductors while still obtaining reliability and adequate life.

In FIG. 7, the relationship of an operated to unoperated button may be seen in which the button 141 is in the unoperated position while the pushbutton 142 has been depressed from the normal position indicated by the dot-dashed line. The beveled surface 152 of the pushbutton 142 has moved the slide plate 130 to the right in the drawing and the transfer switch 61 has been operated to indicate the position of the arm 60 being adjacent the outermost finger 55. Contact by the semicircular spring elements 134 associated with the pushbutton 142 have been made. The internal spring 170 of pushbutton 142 shown partially compressed insures a nearly uniform pressure against the contacts 134 after their closure upon approximately one-third of the travel of the pushbutton 14. The outer return spring 171 limits the extent of travel by compression to its solid height. Contact is made by movement of the operator 133 downward and further movement of the pushbutton 142 compresses the return spring 171 without additional deformation of the spring contacts 134 and with only a slight increase in contact pressure.

Figure 8:
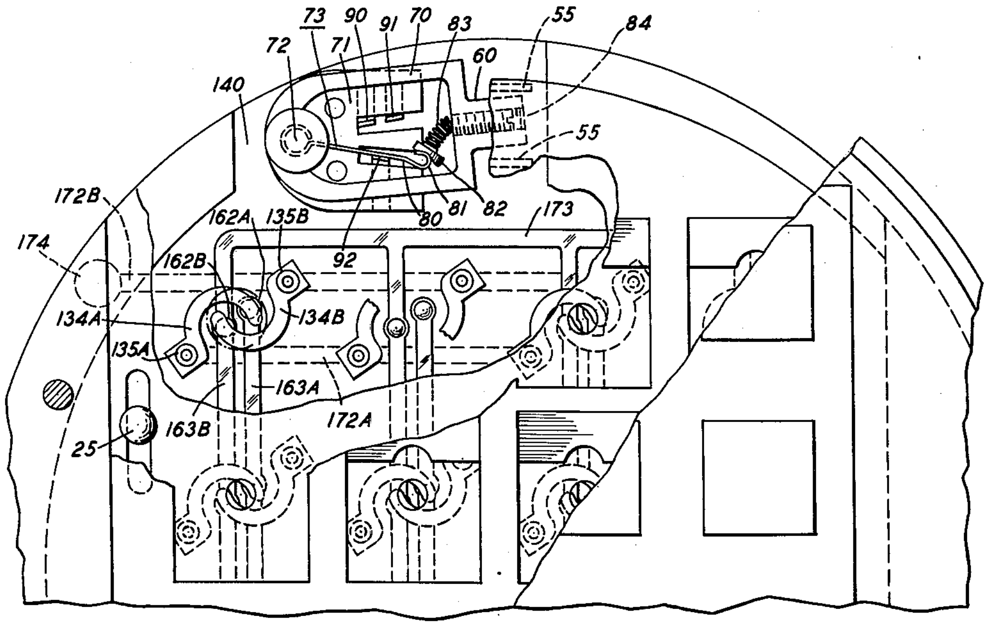
FIG. 8 is an enlarged representation of the assembly of FIG. 2 with the slide plate shown in the operated condition and including details of the transfer switch.

In FIG. 8, the details of the semicircular springs 134 and their relationship to each other and to the printed conductors may be seen. Spring element 134A includes one end secured to stud 135A and the other end is free and positioned directly over a button contact 162A on one of the parallel conductors 163A upon the adjacent face of printed wire board 140. A second contact spring 134B is secured to a similar stud 135B and has its free end positioned directly over button contact 162B in the conducting path. The free ends of both contacts 162A and B are sufficiently close together to allow their depression by the common operating member 133 of the pushbutton shown as a dot-dash circle without danger of contact being made between spring elements 134 or with their adjacent conductor. Both studs 135A and B pierce the board 140 and penetrate the transverse conducting paths 172A and 172B on the opposite face indicated in the drawing of FIG. 8 by dotted lines.

With this arrangement, upon the operation of the pushbutton associated with the contact springs 134A and B electrical connection is completed between the conductor 163B terminating in bus 173 on the adjacent face and the transverse conductor 172B terminating at threaded collar 174. Simultaneously, electrical connection is completed between conductor 163A and 172A through button 162A, semicircular spring 134A and stud 135A. With similar arrangements for each pushbutton sixteen combinations of two independent circuits are controlled by the pushbuttons as well as the common controlled transfer switch circuits.

Figure 3:
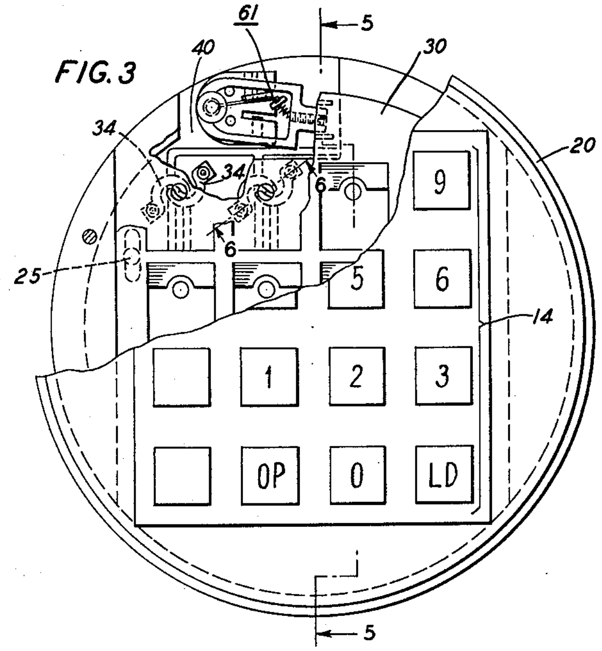
FIG. 3 is a plan view of the assembly with portions of the cover plate and slide plate broken away to show the transfer switch and spring contact elements.
Figure 2:
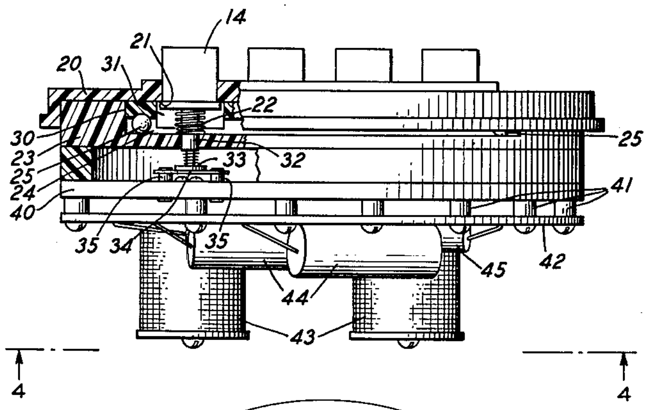
FIG. 2 is an elevational view of the assembly with portions broken away for clarity.

The details of the transfer switch 61 may similarly be seen in FIGS. 3 and 8. In FIG. 3, the switch is in the unoperated position while in FIG. 8 it is operated. Referring now to FIG. 8, the switch 61 comprises the arm 60 described above which forms the termination of a yoke portion 70 pivotally secured at its opposite end to a base member 71. Encompassing the pivot 72 of the yoke is an armature 73 which includes a straight portion 80 terminating in a circular bearing surface 81. The straight portion 80 extends between the pivot 72 and the bearing surface 81 which mates with a concave cap 82 for a captive spring 83 positioned in a recess in the arm 60 of the switch 61. The spring 83 is under controllable compression as determined by the position of a screw 84 in the base of the arm 60. In either the unoperated position, shown in FIG. 3, or the operated position of FIG. 8, the spring 83 is deformed to a stable position in which the armature 73 contacts either a pair of contacts 90 and 91 or the single contact 92.

The transfer switch 61 allows the rapid reliable switching of the calling circuit upon operation of any of the pushbuttons 14. Rapidity is insured by the fact that the fixed contacts 90, 91 and 92 are resilient and will follow the movement of the armature 73 upon operation of the arm 60 until they reach their limit of travel and will thereupon be arrested while the armature 73 continues movement at a high rate. The reliability of switching is insured by the fact that the freely mounted armature 73 offers little resistance to pivotal movement but offers a rigid bearing surface for the deformed spring 83. The pressure on the spring can be varied by adjustment of screw 84 to control the resistance to operation readily without affecting the speed of switching.

The resistance to operation of the pushbutton 14 is a function of four sets of springs, the pushbutton return spring 171, the inner spring 170 of the plungers, the slide plate return springs 54 and the transfer switch captive spring 83. The first three springs, which are merely compressed in a normal manner, offer a low-rate resistance to deformation and alone would describe a straight line force-displacement characteristic for the pushbuttons. The eccentrically loaded spring 83 of the transfer switch 61 provides a nonlinear negative slope force-displacement characteristic typical of a snap action switch. The combination of the two types of spring loading of the switch insures that the pushbutton offers a constant resistance during the early part of travel during which the primary or frequency-determining circuits are closed followed by a reduced resistance or breakthrough coincident with transfer switch operation whereupon the calling signal generator is operative to produce a pulse of the two selected frequencies.

Considered again as a whole the assembly of this invention constitutes a complete signal generator for a telephone system including a miniature oscillator which is powered over conductors connected to the assembly, includes a pair of crosspoint matrices for simultaneously establishing two circuits which determine dual frequencies of oscillation of the oscillator and means for rapidly connecting the oscillator to the output connections and thereafter disconnecting the entire signal generating apparatus. This entire assembly which includes close mechanical and electrical connection by the same elements of the switching mechanism and the circuit also allows their repeated disassembly for purposes of inspection, replacement of either portion for repair.

In all cases, it is understood that the abovedescribed arrangements are merely illustrative of the principles of the invention. Numerous and varied other embodiments may be devised in accordance with these principles by those skilled in the art without departing from the spirit and scope of the invention.

What is claimed is:

1. A pushbutton controlled crosspoint switching assembly for controlling multiple electrical circuits comprising a frame, an insulating plate secured to said frame, a coordinate conductive system including a plurality of pairs of conductors extending longitudinally along one face of said insulating plate, and a plurality of pairs of conductors extending transversely along the opposite face of said insulating plate, said plurality of pairs of conductors constituting a pair of electrically independent matrices, means individual to each matrix intersection for making contact between a transverse and a longitudinal conductor, said contacting means including portions extending through said insulating plate and into contact with a longitudinal conductor, said contacting means also including the portion selectively connected to a transverse conductor, and pushbutton means associated with the intersection of the matrices for operating a pair of said connecting means to close the circuits between their respective transverse and longitudinal conductors.

2. The combination in accordance with claim 1 wherein said contacting means comprises a stud secured to said insulating plate extending therethrough and into electrical contact with a longitudinal conductor and a spring element secured to the opposite end of said stud in cantilever manner including a free end movable by said pushbutton into contact with a transverse conductor.

3. The combination in accordance with claim 2 wherein said cantilever-spring element comprises a pair of planar spring members in spaced interlocking relationship wherein the free ends are positioned to be jointly depressed by a pushbutton.

4. The combination in accordance with claim 1 wherein said insulating plate includes a plurality of conductive elements positioned around the periphery, a second insulating plate is secured to said first insulating plate by conductive support means secured to said upstanding elements, said second insulating plate mounting a plurality of components and having secured thereto conductive paths describing an electrical circuit, portions of said conductive paths in contact with said conductive securing means whereby said second insulating plate and circuit thereof are mechanically and electrically coupled to said first insulating plate.

5. The combination in accordance with claim 4 wherein said first insulating plate comprises a printed circuit crosspoint switch, said second insulating plate comprises a printed circuit assembly, said upstanding conductive means comprises a plurality of metallic collars secured to said first insulating plate and said connecting means comprising a plurality of elements threadably secured to said collars.

6. A pushbutton controlled crosspoint switch assembly comprising a frame, an insulating plate, a plurality of conductors extending longitudinally on one side of said insulating plate, a plurality of conductors extending transversely on the opposite side of said insulating plate, said longitudinal and transverse conductors constituting a matrix, conductive means extending through said plate into contact with respective longitudinal extending conductors and including resilient portions in spaced relationship from said transverse extending conductor, a slide plate mounted for transverse movement along said frame overlying said insulating plate, said slide plate including openings coextensive with the position of the resilient portions of said conducting means, a plurality of pushbuttons for depressing said resilient portions of said conductive means to effect electrical connection between respective longitudinal and transverse conductors, said pushbuttons and slide plate including cooperating beveled surfaces for displacement of said slide plate upon depression of said pushbuttons, first spring means having a uniform force-displacement characteristic for restraining the slide plate from motion, second spring means for restraining said slide plate from motion, said second spring means having a negative slope force displacement characteristic, whereby the resistance to depression of said pushbuttons is a nonlinear function of said first and second resilient means.

7. The combination in accordance with claim 6 wherein said second spring means comprise a switch including an operating arm rotatably secured to said frame, said arm displaceable by said insulating plate, and an eccentrically loaded spring element positioned within said arm.

8. The combination in accordance with claim 7 wherein said switch includes means for controlling the amount of eccentric loading of said spring element whereby the resistance characteristic of said pushbuttons includes a controllable breakthrough.

9. The combination in accordance with claim 8 wherein said switch is coupled to said pushbuttons through the slide plate operable by all of the pushbuttons.

10. The combination in accordance with claim 7 wherein said switch includes an armature rotatably secured to said frame and said spring element is compressed between said armature and said arm.

11. The combination in accordance with claim 10 wherein said arm includes adjustable contact means for adjusting the extent of contact between said arm and said spring.

12. The combination in accordance with claim 10 wherein said switch includes contacts positioned for the completion of circuit through said armature.

13. A switch mechanism comprising a frame, a yoke including a central opening, said yoke rotatably secured to said frame, a plurality of contacts secured to said frame and extending into the opening in said yoke, an armature rotatably secured to said frame about a common axis with said yoke, spring means secured to the free end of said yoke and extending into the opening in said yoke, the ends of said spring and armature being in abutting relationship, said spring being under compression and normally displacing said armature from an intermediate aligned position, said contact means limiting the displacement of said armature, and pushbutton means coupled to said yoke for rotating said yoke to cause said armature to be displaced through the intermediate aligned position into contact with a second of said plurality of contacts.

14. A switch mechanism comprising a frame, a yoke including a central opening having one end rotatably secured to said frame, a plurality of contacts secured to said frame and extending into the opening of said yoke, an armature rotatably secured to said frame and lying within the opening of said yoke between certain of said contacts, a spring positioned in an opening in the free end of said yoke, one end of said spring being compressed in abutting relationship to said armature, thereby tending to displace said armature from an intermediate aligned position to a stable position against one of said plurality of contacts on either side of said armature, means for adjustably controlling compression of said spring, and means for displacing said yoke to effect a transfer of said armature from one contact to a contact on the opposite side thereof.

15. A switch mechanism for controlling multiple circuits comprising a frame, a plate slidably mounted on said frame, a yoke including a central opening rotatably mounted on said frame, said yoke including a portion coupled to said plate to be rotated upon the displacement of said plate, an armature secured to said frame and extending into the opening in said yoke, a plurality contact means extending into the opening of said yoke on opposite sides of said armature, spring means secured to the portion of said yoke rotatable by said plate and in abutting relationship with said armature, and pushbutton means mounted by said frame for displacement of said plate upon the depression of said push-button means.

16. A push button controlled cross point switch assembly comprising a frame, an insulating plate secured to said frame, a first plurality of conductors extending along one side of said insulating plate and a second plurality of conductors extending along the other side of said insulating plate, conductive means extending through said insulating plate into contact with said first plurality of conductors, said conductive means including resilient portions in juxtaposition with said second plurality of conductors, a slide plate overlying said insulating plate and secured to said frame so as to be movable in a plane approximately parallel to said insulating plate, said slide plate including openings coextensive with the resilient portions of said conductive means, a plurality of push buttons extending through the openings in said slide plate and engaging the resilient portions of said conductive means, said push buttons having bevelled surfaces engaging said slide plate, an individual push button when depressed displacing said slide plate and effecting an electrical contact between the resilient portion of said conductive means engaged thereby and the respective conductor of said second plurality of conductors so as to connect said conductor of said second plurality of conductors with a conductor of said first plurality of conductors, and said slide plate when displaced operating a switch.

References Cited in the file of this patent

UNITED STATES PATENTS

| | | |
|---|---|---|
| 353,184 | Wehrle | Nov. 23, 1886 |
| 1,568,508 | Johnson | Jan. 5, 1926 |
| 1,820,264 | Wilson | Aug. 25, 1931 |
| 2,287,797 | Hanley | June 30, 1942 |
| 2,438,496 | Deakin | Mar. 30, 1948 |
| 2,652,470 | Batcheller | Sept. 15, 1953 |
| 2,733,320 | Herterick | Jan. 31, 1956 |
| 2,854,552 | Gouverneur | Sept. 30, 1958 |
| 2,903,633 | Cother | Sept. 8, 1959 |
| 2,916,566 | Meyer | Dec. 8, 1959 |